US012466443B2

(12) United States Patent
Johnson et al.

(10) Patent No.: US 12,466,443 B2
(45) Date of Patent: Nov. 11, 2025

(54) SYSTEMS AND METHODS FOR VEHICULAR SAFETY CONTROL

(71) Applicant: Mapless AI, Inc., Pittsburgh, PA (US)

(72) Inventors: Jeffrey Kane Johnson, Pittsburgh, PA (US); Philipp Robbel, Boston, MA (US)

(73) Assignee: Mapless AI, Inc., Pittsburgh, PA (US)

( * ) Notice: Subject to any disclaimer, the term of this patent is extended or adjusted under 35 U.S.C. 154(b) by 692 days.

(21) Appl. No.: 17/714,254

(22) Filed: Apr. 6, 2022

(65) Prior Publication Data

US 2022/0340165 A1 Oct. 27, 2022

Related U.S. Application Data

(60) Provisional application No. 63/177,577, filed on Apr. 21, 2021.

(51) Int. Cl.
*B60W 60/00* (2020.01)
*B60W 30/18* (2012.01)

(52) U.S. Cl.
CPC .... *B60W 60/005* (2020.02); *B60W 30/18163* (2013.01); *B60W 2552/00* (2020.02); *B60W 2556/40* (2020.02); *B60W 2720/10* (2013.01); *B60W 2720/106* (2013.01)

(58) Field of Classification Search
CPC ......... B60W 60/005; B60W 30/18163; B60W 2552/00; B60W 2556/40; B60W 2720/10; B60W 2720/106; B60W 30/095; B60W 40/04; B60W 30/09
See application file for complete search history.

(56) References Cited

U.S. PATENT DOCUMENTS

2018/0362031 A1* 12/2018 Chang .................... G07C 5/008

* cited by examiner

*Primary Examiner* — Brian P Sweeney
(74) *Attorney, Agent, or Firm* — Moser Taboada

(57) ABSTRACT

Methods and systems for providing vehicular safety control are described herein. In some embodiments, a system of vehicular safety control can help reduce or avoid human, animal, property, monetary, time and/or energy losses. The system comprises or uses sensors to perceive driving environments, and analyses of guidance commands and sensor data can evaluate potential risks. In general, implementations may include a computer-based method for controlling a vehicle, the method comprising: (a) receiving sensor data; (b) receiving a guidance command; (c) analyzing the sensor data and the guidance command, wherein the analysis comprises assessing a potential risk; and generating a control signal, wherein (1) when a potential risk is not detected, generating a control signal comprises converting the guidance command into the control signal, and (2) when a potential risk is detected, generating a control signal comprises modifying the guidance command and converting a modified guidance command into the control signal.

20 Claims, 9 Drawing Sheets

Make a left turn and go to XYZ (502)

{
"goal": "XYZ",
"turn": "left"
}

(504)

(506)

512

Speed: 30m/s

516

514  (510)  518

(702)

(704)

(706)

(708)

SYSTEMS AND METHODS FOR VEHICULAR SAFETY CONTROL

CROSS-REFERENCE TO RELATED APPLICATIONS

This application claims priority to and the benefit of U.S. Provisional Application Ser. No. 63/177,577, filed on Apr. 21, 2021, the entire contents of which are incorporated here by reference.

BACKGROUND

This description relates to technologies of vehicular safety control.

SUMMARY

Techniques described in this document are provided for vehicular safety control. Modern vehicles include various driving capabilities, such as manual driving, semi-autonomous driving, and fully autonomous driving. Vehicular safety control can enhance safety to avoid or reduce risks (e.g., collisions, break-down).

Among other advantages of these aspects, features, and implementations are the following. A system of vehicular safety control can help reduce or avoid human, animal, property, monetary, time and/or energy losses. The system comprises or uses sensors to perceive driving environments, and analyses of guidance commands and sensor data can evaluate potential risks.

In general, in an aspect, implementations include a computer-based method for controlling a vehicle, the method comprising: (a) receiving sensor data; (b) receiving a guidance command; (c) analyzing the sensor data and the guidance command, wherein the analysis comprises assessing a potential risk; and generating a control signal, wherein (1) when a potential risk is not detected, generating a control signal comprises converting the guidance command into the control signal, and (2) when a potential risk is detected, generating a control signal comprises modifying the guidance command and converting a modified guidance command into the control signal.

In general, in an aspect, implementations include one or more non-transitory computer storage media storing machine-readable instructions that, when executed by one or more computing devices, cause the one or more computing devices to perform operations of controlling a vehicle, the operations comprising: (a) receiving sensor data; (b) receiving a guidance command; (c) analyzing the sensor data and the guidance command, wherein the analysis comprises assessing a potential risk; and (d) generating a control signal, wherein (1) when a potential risk is not detected, generating a control signal comprises converting the guidance command into the control signal, and (2) when a potential risk is detected, generating a control signal comprises modifying the guidance command and converting the modified guidance command into the control signal.

In general, in an aspect, implementations include a computing device, the computing device comprising (a) one or more processors, and (b) one or more non-transitory computer storage media storing machine-readable instructions that, when executed by the one or more processors, cause the one or more processors to perform operations of controlling a vehicle, the operations comprising: (1) receiving sensor data; (2) receiving a guidance command; (3) analyzing the sensor data and the guidance command, wherein the analysis comprises assessing a potential risk; and (4) generating a control signal, wherein (i) when a potential risk is not detected, generating a control signal comprises converting the guidance command into the control signal, and (ii) when a potential risk is detected, generating a control signal comprises modifying the guidance command and converting the modified guidance command into the control signal.

In general, in an aspect, implementations include an electronic apparatus for controlling safety of a vehicle, the electronic apparatus comprising: (a) a receiving element configured to receive sensor data; (b) a receiving element configured to receive a guidance command; (c) an analysis element configured to analyze the sensor data and the guidance command, wherein the analysis comprises assessing a potential risk; and (d) a controller configured to generate a control signal, wherein (1) when a potential risk is not detected, generating a control signal comprises converting the guidance command into the control signal, and (2) when a potential risk is detected, generating a control signal comprises modifying the guidance command and converting the modified guidance command into the control signal.

In general, in an aspect, implementations include a vehicle comprising: (a) steering, acceleration, and braking devices; (b) one or more sensors; (c) a receiving element configured to receive sensor data; (d) a receiving element configured to receive a guidance command; (e) an analysis element configured to analyze the sensor data and the guidance command, wherein the analysis comprises assessing a potential risk; and (f) a controller configured to generate a control signal, wherein (1) when a potential risk is not detected, generating a control signal comprises converting the guidance command into the control signal, and (2) when a potential risk is detected, generating a control signal comprises modifying the guidance command and converting the modified guidance command into the control signal.

Implementations of the method, the media, the computing device, the electronic apparatus, and the vehicle may include controlling a vehicle that comprises a manual driving function, a semi-autonomous driving function, or an autonomous driving function, or a combination of them.

Implementations of the method, the media, the computing device, the electronic apparatus, and the vehicle may include, or may use a receiving element for, receiving sensor data from one or more sensors on the vehicle. In some embodiments, receiving sensor data comprises receiving sensor data from a remote server through wired or wireless, or both, communication. The sensor data may comprise data from one or more cameras, one or more lidar sensors, one or more radar sensors, one or more inertial measurement units, one or more accelerometers, one or more gyroscopes, one or more global position systems, one or more infrared cameras, one or more ultrasonic sensors, one or more rain sensors, one or more wetness sensors, one or more microphones, one or more crash sensors, one or more tire pressure sensors, one or more odometry sensors, one or more dead reckoning sensors, one or more range sensors, or a combination of them.

Implementations of the method, the media, the computing device, the electronic apparatus, and the vehicle may include a guidance command. The guidance command may comprise a route, a path, a traveling distance, a lane, a lane change, a speed, a speed limit, a velocity, an angular velocity, an acceleration, an acceleration limit, a lateral acceleration, a lateral acceleration limit, a longitudinal acceleration, a longitudinal acceleration limit, a deceleration, a deceleration limit, a lateral deceleration, a lateral deceleration limit, a longitudinal deceleration, a longitudinal deceleration limit, a speed profile, an acceleration profile, a deceleration profile, an orientation, a longitudinal orientation, a lateral orientation, a goal location, a motion plan, a driving task, a parking task, a pickup task, a drop-off task, a parking location, a pickup location, a drop-off location, a point-to-point navigation, a steering angle, a brake percentage, a throttle percentage, a pedal position, a gear selection, a gear shifter position, an object distance offset, an object time offset, a turning rate, a turning rate limit, one or more control parameters, or a combination of them. In some embodiments, receiving a guidance command may be from one or more of the following: (1) an in-vehicle human operator maneuvering the vehicle; (2) a remote human operator tele-maneuvering the vehicle; (3) an in-vehicle algorithm maneuvering the vehicle; (4) a remote algorithm tele-maneuvering the vehicle; (5) a remote server through wired or wireless, or both, communication; or (6) a remote chauffeur, the remote chauffeur comprising a human operator or an algorithm, or a combination of them. In some cases, receiving a guidance command comprises sending a command request from the vehicle to a remote server followed by receiving the guidance command from the remote server.

In some implementations of the method, the media, the computing device, the electronic apparatus, and the vehicle, analyzing the sensor data and the guidance command comprises using a pre-recorded map. A pre-recorded map may comprise a detailed map of an environment. In some cases, a pre-recorded map comprises a high-resolution map, the high-resolution map comprising information of a lane width or information enabling the derivation of lane width. In some embodiments, a pre-recorded map comprises a high-resolution map derived from sensor data. In some applications, a pre-recorded map includes human annotations.

Implementations of analyzing the sensor data and the guidance command may not include using a pre-recorded map. In some cases, analyzing the sensor data and the guidance command does not include using a high-resolution map. In some applications, analyzing the sensor data and the guidance command does not include using a high-resolution map derived from sensor data. In some embodiments, analyzing the sensor data and the guidance command does not include using a pre-recorded map having human annotations.

Some implementations of analyzing the sensor data and the guidance command may not depend on a lane-level map. In some cases, a lane-level map comprises one or more of the following: information of a lane width, information enabling derivation of a lane width, information of a road width, information enabling derivation of a road width, a geometric map of an environment, information for deriving a geometric map of an environment, a road network topology, or information for deriving a road network topology. In some applications, a lane-level map comprises a human annotation. In some embodiments, a lane-level map is derived from sensor data.

Implementations of analyzing the sensor data and the guidance command may utilize information included in a lane-level map.

Implementations of analyzing the sensor data and the guidance command may comprise creating a representation of an environment when the vehicle is in operation. In some embodiments, analyzing the sensor data and the guidance command comprises aggregating measurements of the environment over time. In some cases, analyzing the sensor data and the guidance command comprises discarding the representation of the environment, a history of the representation of the environment, or a partial history of the representation of the environment when a distance or a time, or both, between first measurements constituting a first representation and second measurements constituting a second representation exceeds a threshold. In some applications, analyzing the sensor data and the guidance command comprises detecting a collision. In some examples, analyzing the sensor data and the guidance command comprises detecting a software failure in the vehicle, in one or more sensors, or in a combination of them. In some instances, analyzing the sensor data and the guidance command comprises detecting a hardware failure in the vehicle, in one or more sensors, or in a combination of them. In some embodiments, analyzing the sensor data and the guidance command comprises detecting a vehicle component failure.

Implementations of analyzing the sensor data and the guidance command may comprise assessing sensor data reliability. The sensor data reliability may comprise a blocked sensor, a partially covered sensor, a fully covered sensor, or a combination of them. Some implementations may detect a loss of a wired or wireless, or both, communication link. In some embodiments, analyzing the sensor data and the guidance command comprises assessing quality of a wired or wireless, or both, communication link. In some cases, analyzing the sensor data and the guidance command comprises assessing plausibility of the sensor data. In some applications, analyzing the sensor data and the guidance command comprises assessing plausibility of a representation of the environment. In some scenarios, analyzing the sensor data and the guidance command comprises detecting incapacitation of an in-vehicle human operator. In some instances, analyzing the sensor data and the guidance command comprises detecting one or more conditions in a vehicle cabin. Examples of the one or more conditions in a vehicle cabin comprise one or more of the following: application or removal of a seat belt, a passenger entering or departing a front or driver seat, presence of a child seat, deployment of an airbag, invalid seating position, smoke, fire, obstructed view, or a blockage of an airbag.

Implementations of analyzing the sensor data and the guidance command may comprise detecting one or more of vehicle conditions. A vehicle condition may comprise an abnormal operation condition, door closing or opening, door locking or unlocking, trunk closing or opening, or hazard light operation. In some embodiments, analyzing the sensor data and the guidance command comprises assessing visibility due to one or more environmental conditions. An environmental condition may comprise illuminance, glare, reflections, shadows, cloud cover, rain, standing water, hail, sleet, fog, smoke, dust, spray, splash, or snow. In some applications, analyzing the sensor data and the guidance command comprises assessing a potential risk in an environment.

Implementations of analyzing the sensor data and the guidance command may depend on physical quantity measurements from one or more sensor readouts. Examples of physical quantity measurements include a distance, a speed, an acceleration, a size, a velocity, a friction coefficient, a reflectivity, or a color.

Some implementations of analyzing the sensor data and the guidance command do not depend on recognizing, or segmenting, or detecting, or a combination of them, an object.

Some implementations of analyzing the sensor data and the guidance command do not depend on reasoning about an actor's intent, or motion plan, or behavior, or a combination of them. Some implementations of analyzing the sensor data and the guidance command do not depend on modeling an actor's intent, or motion plan, or behavior. Examples of reasoning or modeling include a mathematical method, a computational method, a statistical model, a probabilistic model, a regression model, a neural network, or a machine learning model.

Some implementations of analyzing the sensor data and the guidance command depend on a given indication about an actor's intent, or motion plan, or behavior, or a combination of them. For instance, when a pedestrian indicates his/her moving direction or when another vehicle signals its lane changing or orientation turning, the implementations herein treat the indications as given in analyzing the sensor data and the guidance command.

Implementations of analyzing the sensor data and the guidance command may comprise mapping the sensor data and the guidance command into a common representation space of an environment. A common representation space of an environment may correspond to an environment observed by one or more sensors over time. In some embodiments, a common representation space of an environment comprises depth information, or flow information, or both. A common representation space of an environment may comprise flow information in a longitudinal or a lateral or both orientations of the vehicle. A common representation space of an environment can include surface drivability information. In some cases, a common representation space of an environment comprises occlusion information. In some applications, a common representation space of an environment comprises time-to-collision information. In some implementations, a common representation space of an environment comprises semantic information of the environment. In some examples, a common representation space of an environment comprises dynamic information of the environment.

Implementations of analyzing the sensor data and the guidance command may comprise analyzing a dynamic feasibility of a motion plan with respect to the guidance command. In some embodiments, analyzing the sensor data and the guidance command comprises analyzing a possibility of colliding with an object. A possibility of collision may be represented by a probability or by a scoring system. In some examples, analyzing the sensor data and the guidance command comprises analyzing drivability of a surface. In some instances, analyzing drivability of a surface comprises using geometric information of the surface to determine the drivability of the surface. In some cases, analyzing drivability of a surface comprises analyzing one or more geometric variations of the surface. In some applications, analyzing drivability of a surface comprises deriving one or more confidence scores to measure regions of drivability on the surface.

Implementations of analyzing the sensor data and the guidance command may comprise detecting one or more occlusions. Detecting one or more occlusions can be performed at a measurement level. In some embodiments, an occlusion is derived based on a sensing limit of a sensor. In some cases, detecting one or more occlusions comprises detecting a surface discontinuity. In some applications, detecting one or more occlusions comprises deriving one or more confidence scores to measure neighborhoods of support.

Implementations of analyzing the sensor data and the guidance command comprises analyzing a scene flow. A scene flow may include a rate of sensor data changes, a flow of velocity, a flow of objects, or a flow of directions, or a combination of them. In some cases, analyzing a scene flow comprises aggregating lateral or longitudinal or both flows based on volumetric data derived from a depth map. In some embodiments, a depth map is derived from measurements from one or more sensors aggregated over time, or is derived from direct or indirect depth measurements from one or more sensors, or is derived from both. In some examples, analyzing a scene flow comprises determining a direction or a magnitude or both of a flow near an occlusion. In some instances, analyzing a scene flow comprises deriving one or more confidence scores to measure spatial or temporal, or both, consistency.

Implementations of analyzing the sensor data and the guidance command may include analyzing uncertainty in the data, uncertainty in the sensor capabilities, uncertainty in the sensor status, or a combination of them.

Implementations of the method, the media, the computing device, the electronic apparatus, and the vehicle include a control signal comprising a direction, where the direction includes a forward direction, a rear direction, an up direction, a down direction, a left direction, or a right direction, or a combination of them. Examples of a control signal include a speed, a velocity, an acceleration, an acceleration change, a deceleration, a deceleration change, an orientation, an orientation change, a steering angle, a steering angle change, a torque, a torque change, a throttle, a throttle change, a brake percentage, a brake percentage change, a throttle percentage, a throttle percentage change, a pedal position, a pedal position change, a gear selection, a gear selection change, a gear shifter position, a gear shifter position, change, a traveling distance, a traveling distance change, a route, a route change, a path, a path change, a lane, or a lane change, or a combination of them.

Implementations of the method, the media, the computing device, the electronic apparatus, and the vehicle include, or use a controller for, generating a control signal based on sensor data of one or more sensors. Generating a control signal may comprise identifying one or more safe state spaces. A safe state space may comprise one or more vehicle states able to avoid a collision. A safe state space may comprise a space with a reduced collision risk or a minimal collision risk. In some embodiments, a safe state space is derived from a model minimizing a cost function, the cost function comprising one or more the following factors: monetary, time, energy consumption, physical damage, human or animal injury, or a combination of those. In some cases, a safe state space comprises a space with a reduced collision loss or a minimal loss when a collision is inevitable. Identifying one or more safe state spaces may comprise approximating the one or more safe state spaces.

Implementations of generating a control signal may comprise identifying one or more stopping regions. In some embodiments, a stopping region extends from an object or from a group of objects. In some cases, a stopping region comprises one or more subregions enabling the vehicle to avoid or mitigate a collision. In some examples, two stopping regions comprise disjoint stopping paths. Identifying one or more stopping regions may comprise evaluating occlusion information by hypothesizing one or more conservative stopping regions along an occlusion boundary. In some embodiments, identifying one or more stopping regions comprises evaluating driving surface information by treating one or more measured non-drivable surface boundaries as immobile objects. In some cases, identifying one or more stopping regions comprises receiving at least one stopping region from vehicle-to-anything communication.

Implementations of generating a control signal may comprise generating a safe envelope of the vehicle. In some embodiments, generating a control signal comprises generating a safe envelope of an object. In some cases, generating a control signal comprises evaluating a dynamic state. In some applications, generating a control signal comprises evaluating a dynamic state of one or more objects inferred from a scene flow. In some examples, generating a control signal comprises evaluating system dynamics involved in reaching a stopping condition. In some instances, generating a control signal comprises identifying a mitigation space when a collision is inevitable. In some embodiments, generating a control signal comprises minimizing a relative velocity between the vehicle and one or more objects or minimizing expected kinetic energy lost in a potential impact. Generating a control signal may consider object information such as type, weight, velocity, orientation, etc. In some scenarios, generating a control signal comprises optimizing the control signal with respect to the guidance command based on an evaluation metric or a loss function. Optimizing the control signal with respect to the guidance command may include a smoothness constraint on a speed, an orientation, an acceleration, a deceleration, a torque, a jerk, or a turn, or a combination of them. Optimizing the control signal with respect to the guidance command may comprise a distance to a safe space, to a stopping space, to a risk mitigation space, or a combination of them.

Implementations of the method, the media, the computing device, the electronic apparatus, and the vehicle may include modifying the guidance command, the modification comprising altering one or more of the following in the guidance command: a route, a path, a traveling distance, a lane, a lane change, a speed, a speed limit, a velocity, an angular velocity, an acceleration, an acceleration limit, a lateral acceleration, a lateral acceleration limit, a longitudinal acceleration, a longitudinal acceleration limit, a deceleration, a deceleration limit, a lateral deceleration, a lateral deceleration limit, a longitudinal deceleration, a longitudinal deceleration limit, a speed profile, an acceleration profile, a deceleration profile, an orientation, a longitudinal orientation, a lateral orientation, a goal location, a motion plan, a driving task, a parking task, a pickup task, a drop-off task, a parking location, a pickup location, a drop-off location, a point-to-point navigation, a steering angle, a brake percentage, a throttle percentage, a pedal position, a gear selection, a gear shifter position, an object distance offset, an object time offset, a turning rate, a turning rate limit, or one or more control parameters. In some embodiments, modifying the guidance command comprises determining a stopping location, determining a path to a stopping space, or determining a path to a risk mitigation space, or a combination of them.

Implementations of the method, the media, the computing device, the electronic apparatus, and the vehicle may update the control signal when a change in a scene captured in the sensor data is detected.

Implementations of the method, the media, the computing device, the electronic apparatus, and the vehicle may include, or comprise a receiving element for, receiving a control process mode. In some embodiments, when the control process mode comprises a passive mode, generating a control signal comprises converting the guidance command into the control signal. Similarly, when the control process mode comprises an active mode and when a potential risk is not detected, generating a control signal comprises converting the guidance command into the control signal. However, when the control process mode comprises an active mode and when a potential risk is detected, generating a control signal may comprise modifying the guidance command and converting the modified guidance command into the control signal.

Implementations of the method, the media, the computing device, the electronic apparatus, and the vehicle may include, or comprise a processing element for, transferring vehicle guidance from an in-vehicle human to an algorithmic operator. Some embodiments may maneuver the vehicle with one or more purposes. In some cases, the implementations enforce a control process mode into an active mode, or activate an emergency safety function that prevents a collision, or both. In some embodiments, an algorithmic operator is in a remote server, or in the vehicle, or both.

Implementations of the method, the media, the computing device, the electronic apparatus, and the vehicle may include, or comprise a processing element for, transferring vehicle guidance from an in-vehicle human to a remote chauffeur. In some embodiments, transferring vehicle guidance from an in-vehicle human to a remote chauffeur is initiated by one or more of the following: the in-vehicle human, a remote chauffeur, an emergency condition, or a detected prohibited condition.

Implementations of the method, the media, the computing device, the electronic apparatus, and the vehicle may include, or comprise a communication element for, streaming the sensor data to a remote server.

Implementations of the method, the media, the computing device, the electronic apparatus, and the vehicle may include, or comprise a processing element for, sharing an assessed potential risk to an external computing process, an external algorithm, a remote server, a remote operator, an in-vehicle human operator, an out-of-vehicle human operator, or a combination of them. In some embodiments, implementations include generating or visualizing or signaling status of safety information.

Implementations of the method, the media, the computing device, the electronic apparatus, and the vehicle may include, or comprise a controller for, transferring a control signal to an actuator of the vehicle, or a drive-by-wire interface to the actuators, or both.

In some implementations, operations of the receiving elements, the analysis element and the controller iterate over time. In some embodiments, any computational step of representation, analysis, assessment, detection, estimation, or generation is performed at a constant running time.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
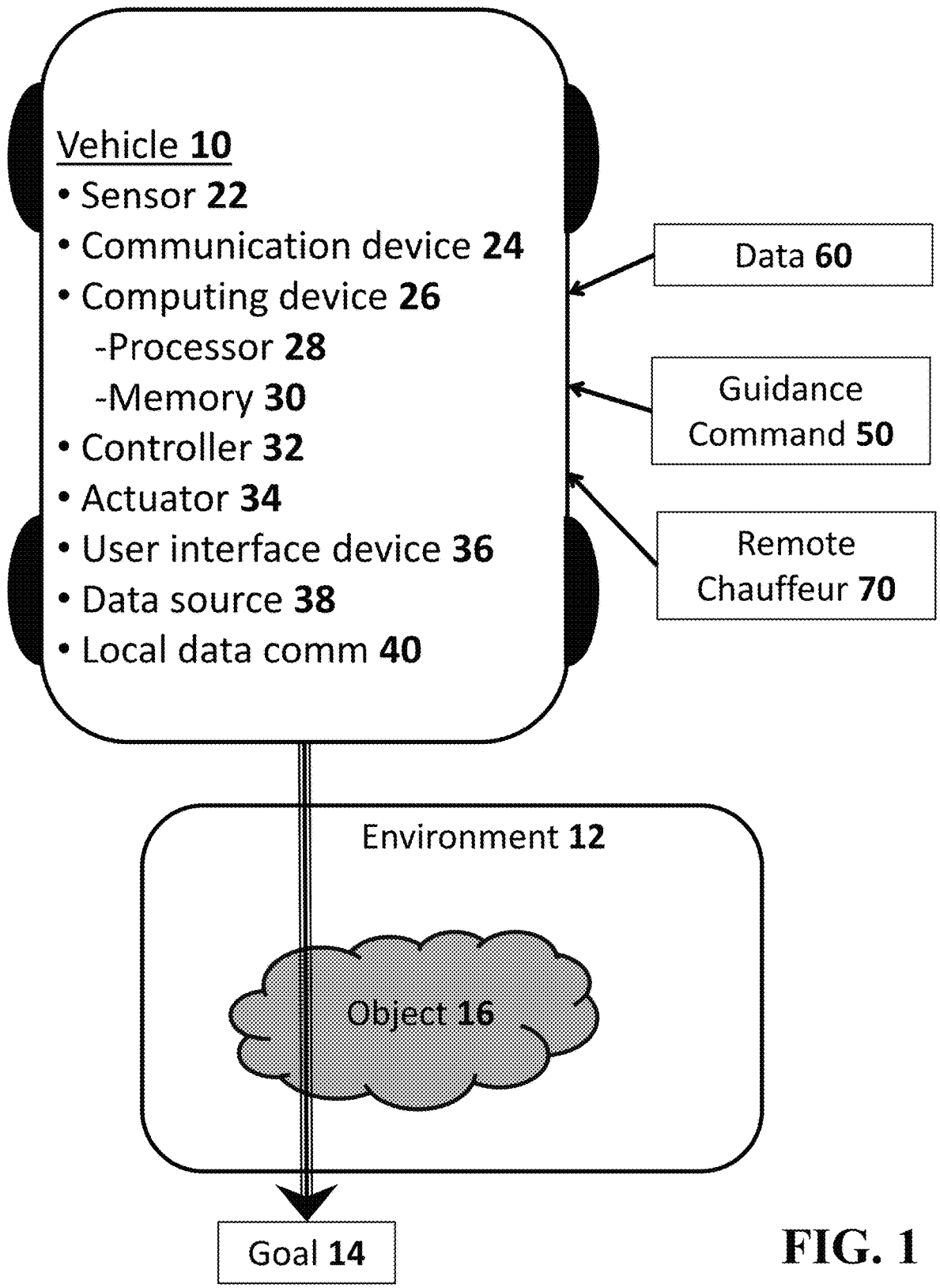
FIG. 1 is an example block diagram of a vehicular safety control system.

In the following description, for the purposes of explanation, specific details are set forth in order to provide a thorough understanding of the disclosed technologies. It will be apparent, however, that the disclosed technologies may be practiced without these specific details. In other instances, well-known structures and devices are shown in block diagram form in order to avoid unnecessarily obscuring the disclosed technologies.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such an element represents one or multiple signal paths (e.g., a bus, a wired communication channel, a wireless communication channel, etc.), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

The term "processor" is used broadly to include, for example, a hardware comprising electronic circuitry able to perform machine instructions designated based on described technologies. This term is used interchangeably with "controller" or "processing circuit".

The term "one or more" means a function being performed by one element, a function being performed by more than one element, e.g., in a distributed manner, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first module could be termed a second module, and, similarly, a second module could be termed a first module, without departing from the scope of the various described embodiments. The first module and the second module are both modules, but they are not the same module.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Vehicular Safety Control System

Vehicles are important for transportation in modern societies. Vehicular safety control is important for maintaining vehicles in a safe condition. The goal of a vehicular safety control system is to avoid collisions, or to minimize loss when a collision is unavoidable. In general, the terms "risk" and "loss" are used interchangeably in this document. Such a system of vehicular safety control can help reduce or avoid human, animal, monetary, property, physical object, time and/or energy losses. In general, vehicles described in this document include vehicles with manual driving functions, or semi-autonomous driving functions, or autonomous driving functions, or combinations of them.

FIG. 1 illustrates a vehicular safety control system. Typically, a vehicular safety control system performs on a vehicle 10. The system's purpose is to control the vehicle 10 to move through an environment 12 to a goal location 14, while avoiding colliding to any objects 16 and obeying prescribed rules and/or preferences.

A vehicular safety control system usually includes an array of technologies (e.g., hardware, software, data communication, data acquisition etc.), described below.

1. A vehicular safety control system may comprise or use one or more sensors 22 to perceive an environment 12 where the vehicle is operating.

2. A vehicular safety control system may comprise or use one or more communications devices 24 to transmit or receive one or more guidance commands 50 and various types of data 60.
3. A vehicular safety control system may comprise or use one or more computing devices 26, which comprise one or more processors 28 and memory 30, to perform computational tasks, such as analysis, assessment, detection, identification, estimation, optimization, generation, etc.
4. A vehicular safety control system may comprise or use one or more controllers 32 to determine control mechanisms and generate control signals that will be sent to one or more actuators 34 for maneuvering the vehicle.
5. A vehicular safety control system may comprise or use one or more user interface devices 36 to receive a user's inputs (e.g., preferences, routes, goal locations, purposes, guidance commands, requests for guidance takeover by a remote chauffeur 70) or display information (e.g., a perceived environment 12, a goal location 14, vehicle status, etc.). In some embodiments, user interface devices can generate audio/sound output, or receive a user's speech input, or both. In some implementations, user interface devices are installed inside the vehicle (e.g., for communicating with in-vehicle people), outside the vehicle (e.g., for communicating with people in the vicinity of the vehicle), attached to the vehicle (e.g., for communicating with people in the vicinity of the vehicle), in a remote place (e.g., for communications between a remote chauffeur 70 and the vehicle 10), or combinations of them.
6. A vehicular safety control system may comprise or use one or more data sources 38 that store raw sensor data, processed sensor data, analyzed information, historical information, etc.
7. A vehicular safety control system may comprise or use one or more data communication mechanisms 40 for receiving and/or transmitting data between devices (e.g., between two computing devices, between a computing device and a sensor, etc.). Examples of data communication mechanisms include data buses, such as Ethernet, Controller Area Network (CAN), FlexRay, LIN, or MOST.
8. A vehicular safety control system may comprise or use one or more remote chauffeurs 70, with a capability of communicating with the vehicle. A remote chauffeur may be a human operator, or an algorithm, or a combination of them. A remote chauffeur may comprise or use a computing device. A remote chauffeur may comprise or use a communication device (e.g., 4G, 5G, 6G, WiFi, radio frequency). A remote chauffeur may comprise or use user interface devices (e.g., a display, a microphone, a speaker, a steering wheel, a braking system, a gear stick, pedals, actuators, etc.).

Figure 2:
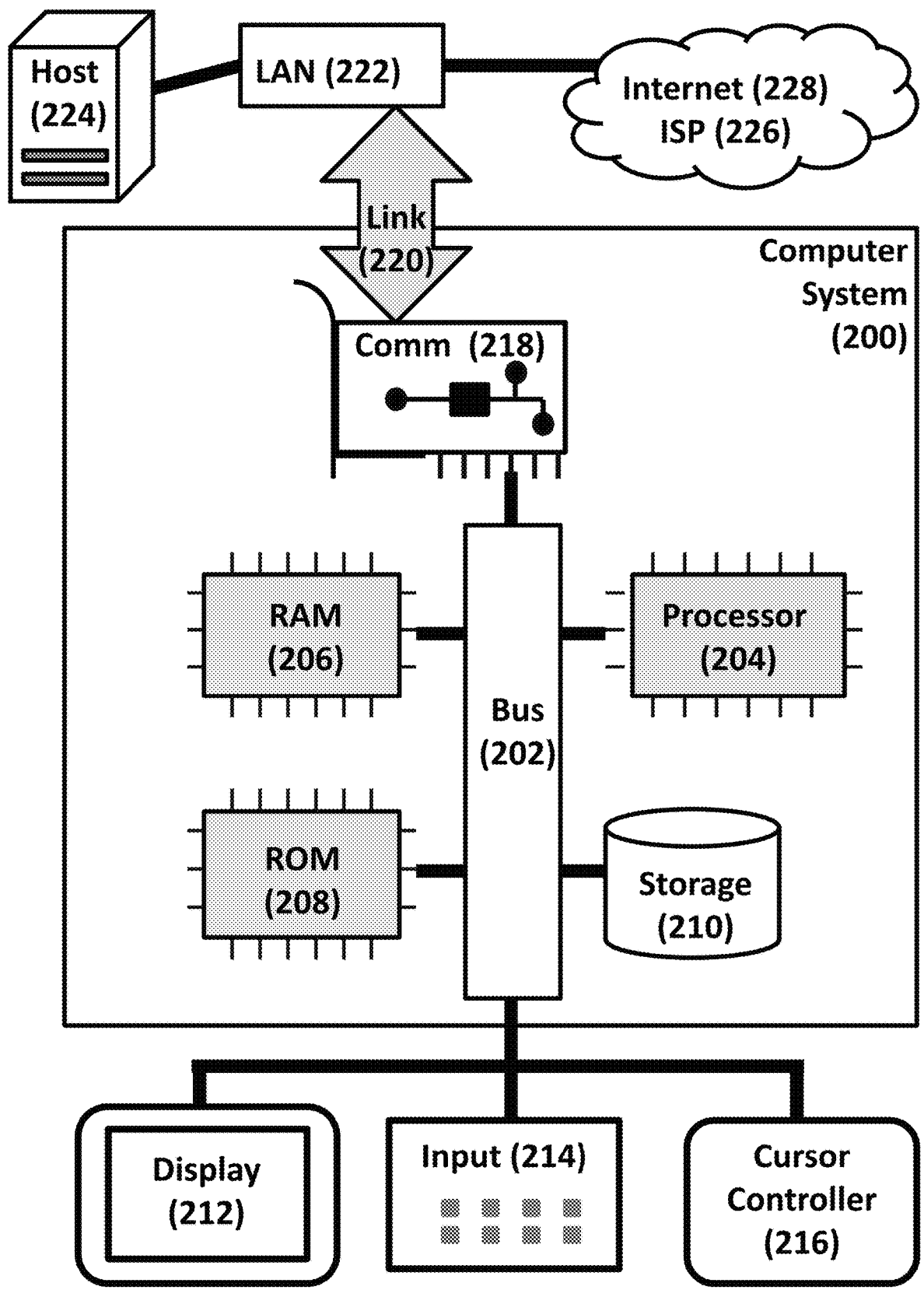
FIG. 2 is an example of a computer system.

In various implementations, a vehicle safety control system comprises a computer system, or is coupled with a computer system, or both. FIG. 2 illustrates a computer system 200. In an implementation, the computer system 200 is a special-purpose computing device. The special-purpose computing device is hard-wired to perform the described technologies or includes digital electronic devices such as one or more application-specific integrated circuits (ASICs) or field programmable gate arrays (FPGAs) that are persistently programmed to perform the technologies, or may include one or more general purpose hardware processors programmed to perform the technologies pursuant to program instructions in firmware, memory, other storage, or a combination. Such special-purpose computing devices may also combine custom hard-wired logic, ASICs, or FPGAs with custom programming to accomplish the technologies. In various embodiments, the special-purpose computing devices are desktop computer systems, portable computer systems, handheld devices, network devices or any other device that incorporates hard-wired and/or program logic to implement the techniques.

In some embodiments, the computer system 200 includes a bus 202 or other communication mechanism for communicating information, and a hardware processor 204 coupled with a bus 202 for processing information. The hardware processor 204 is, for example, a general-purpose microprocessor. The computer system 200 also includes a main memory 206, such as a random-access memory (RAM) or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In some embodiments, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to some embodiments, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210.

Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In various embodiments, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and sends the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 may optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented, such as cellular, 4G, 5G, 6G, WiFi, radio frequency, etc. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains a cloud or a part of the cloud.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

Figure 3:
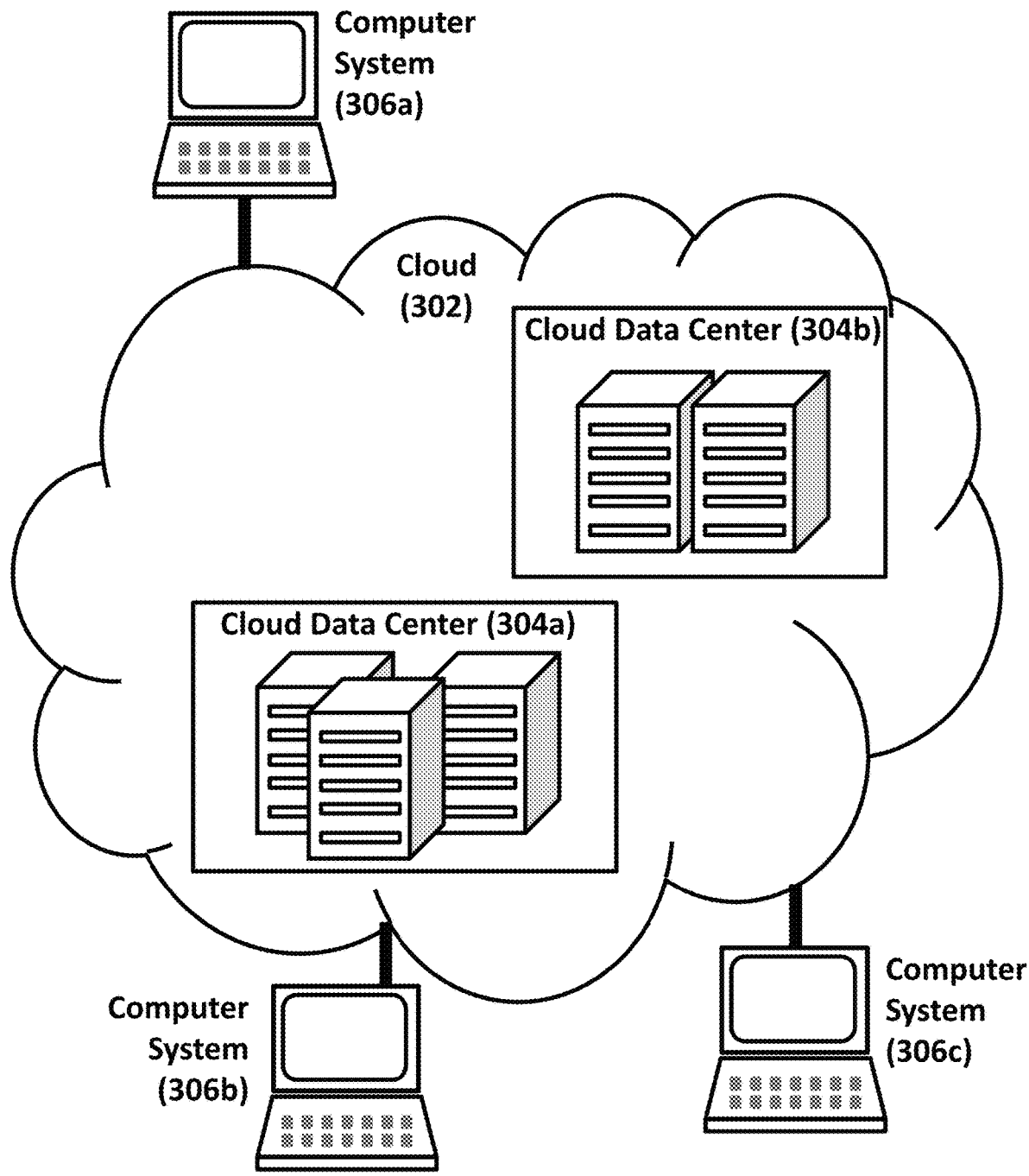
FIG. 3 is an example of a cloud computing system.

FIG. 3 illustrates an example of a "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 3, the cloud computing environment includes cloud data centers (e.g., 304a and 304b) that are interconnected through the cloud 302. Data centers 304a and 304b provide cloud computing services to computer systems 306a, 306b and 306c connected to cloud 302.

A cloud computing environment (e.g., shown in FIG. 3) includes one or more cloud data centers. In general, a cloud data center, for example the cloud data center 304a shown in FIG. 3, refers to the physical arrangement of servers that make up a cloud, for instance the cloud 302 or a particular portion of a cloud. In some examples, servers are physically arranged in a cloud data center into rooms, groups, rows, and racks. A cloud data center has one or more zones, which include one or more rooms of servers. Each room has one or more rows of servers, and each row includes one or more racks. Each rack includes one or more individual server nodes. In some implementations, servers in zones, rooms, racks, and/or rows are arranged into groups based on physical infrastructure requirements of the data center facility, which include power, energy, thermal, heat, and/or other requirements. In an embodiment, the server nodes are similar to the computer system described in FIG. 2. The data center 304a in FIG. 3 has many computer systems distributed through many racks.

In various implementations, a vehicle safety control system comprises a remote server, or uses a remote server, or communicates with a remote server, or is coupled with a remote server. Referring to FIG. 3, a remote server is connected to, or part of, a cloud environment 302. The cloud 302 includes cloud data centers 304a and 304b along with the network and networking resources (for example, networking equipment, nodes, routers, switches, and networking cables) that interconnect the cloud data centers 304a and 304b and allow the computer systems 306a, 306b and 306c to have access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

Computer systems (e.g., 306a, 306b and 306c) or cloud computing services are connected to the cloud 302 through network links and network adapters. In an embodiment, the computer systems (e.g., 306a, 306b and 306c) are implemented as various computing devices, for example servers, desktops, laptops, tablet, smartphones, Internet of Things (IoT) devices, and consumer electronics. In an embodiment, the computer systems (e.g., 306a, 306b and 306c) are implemented in or as a part of other systems.

Figure 4:
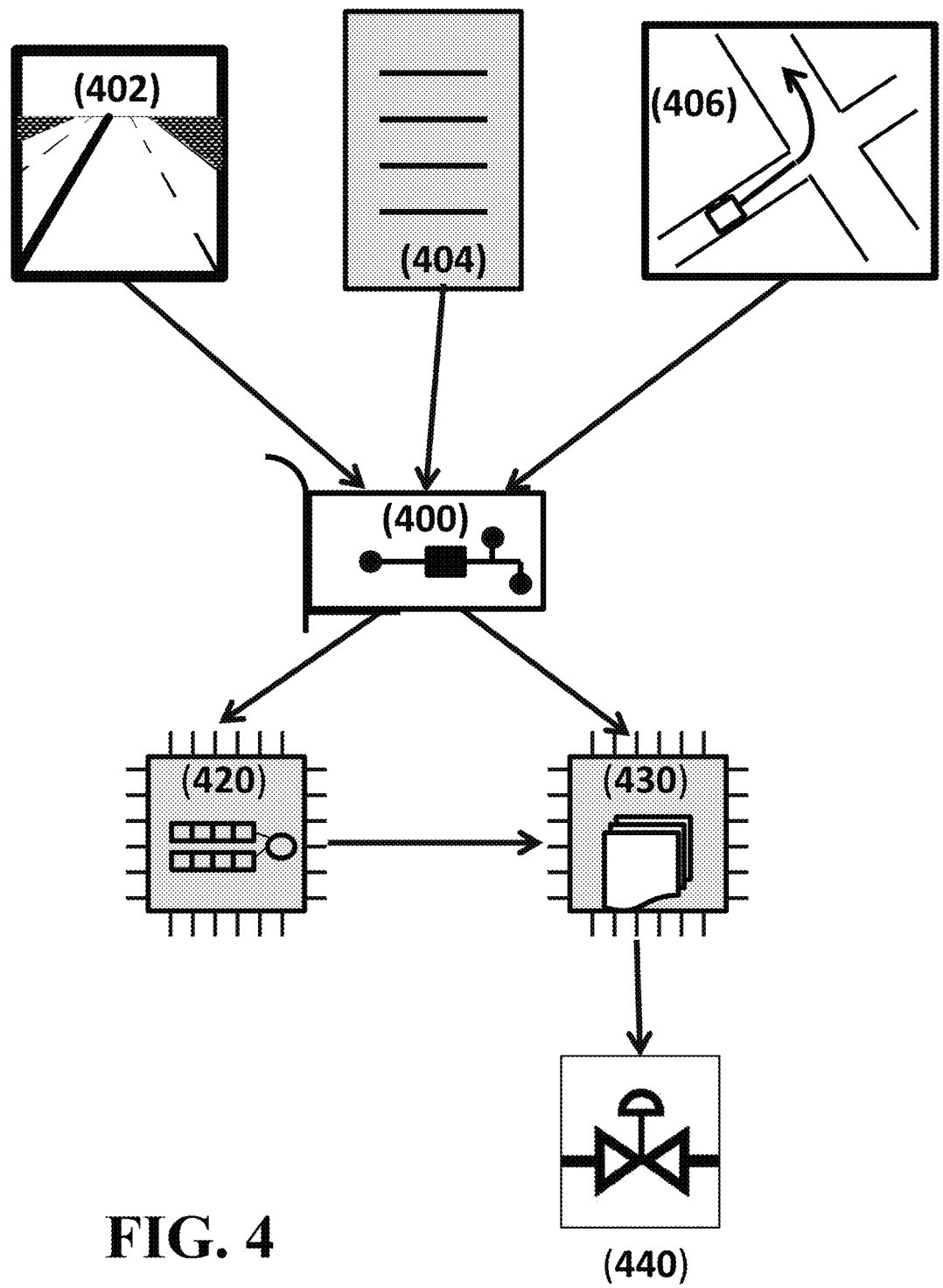
FIG. 4 is an example of data receiving and analysis process.

FIG. 4 illustrates example embodiments of the technology described in this document. A vehicle safety control system may include a communication interface 400 to receive sensor data 402 and one or more guidance commands (404 and 406). A guidance command may be in a form of a language 404 (e.g., texts, voices, computer code, etc.) and/or in a form of depiction 406 (e.g., drawings, rendering, illustrations, etc.). The system comprises or uses a compute resource 420 to analyze the sensor data and the guidance commands. Analyzing the sensor data and the guidance commands includes assessing a potential risk. The system comprises or uses a compute resource (or a controller) 430 to generating a control signal based on the sensor data, guidance commands and/or the analysis results. The control signals are passed to actuators 440 to move vehicles to avoid risks or mitigating risks.

Guidance Command

Figure 5:
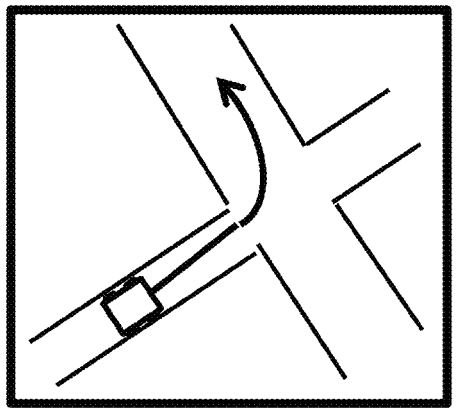
FIG. 5 is an example of guidance commands.
Figure 5:
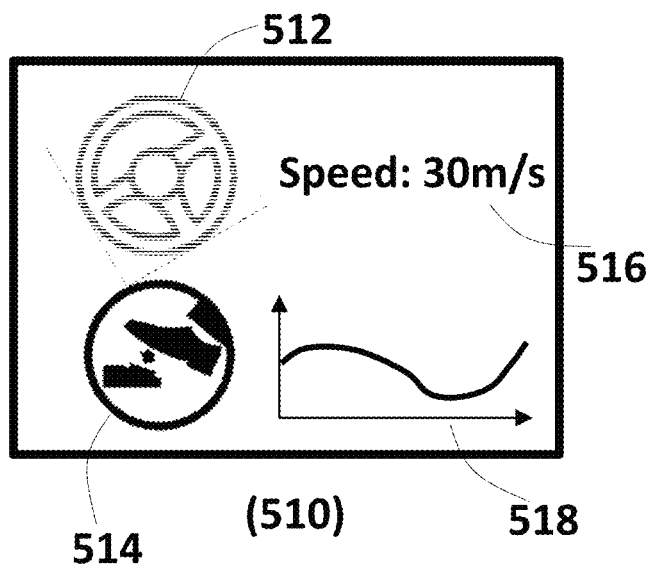

The technology described in this document may include one or more guidance commands or use one or more guidance commands. In general, guidance commands convey an intent to maneuver a vehicle or are related to one or more vehicle maneuvers. Guidance commands are in the form of machine-readable instructions, which may or may not be readily human readable or human understandable. In some embodiments, the form of a guidance command may be in texts, voices, drawings, rendering, illustrations, computer codes, or a combination of them. FIG. 5 illustrates examples of guidance commands; for example, a guidance command may be texts of "make a left turn and go to XYZ" in a human language 502. A guidance command can be in a form of computer code 504. A guidance command can be in a form of visualization 506. In examples of 510, guidance commands include direct steering wheel torques, angles (512); pedal percentage (514); velocities, accelerations; a quantity can be indicated as a single value (516) or a profile (518).

Examples of guidance commands include, but are not limited to, a route, a path, a traveling distance, a lane, a lane change, a speed, a speed limit, a velocity, an angular velocity, an acceleration, an acceleration limit, a lateral acceleration, a lateral acceleration limit, a longitudinal acceleration, a longitudinal acceleration limit, a deceleration, a deceleration limit, a lateral deceleration, a lateral deceleration limit, a longitudinal deceleration, a longitudinal deceleration limit, a speed profile, an acceleration profile, a deceleration profile, an orientation, a longitudinal orientation, a lateral orientation, a goal location, a motion plan, a driving task, a parking task, a pickup task, a drop-off task, a parking location, a pickup location, a drop-off location, a point-to-point navigation, a steering angle, a brake percentage, a throttle percentage, a pedal position, a gear selection, a gear shifter position, an object distance offset, an object time offset, a turning rate, a turning rate limit, one or more control parameters, or a combination of them.

In some applications, a guidance command comprises desired driving preferences; for example, distance to an object, time offsets, limits on turning rates, limits on lateral accelerations, limits on longitudinal accelerations, limits on linear velocities, limits on angular velocities, speed limits, acceleration profiles, deceleration profiles, and control parameters.

In various embodiments, a guidance command may be received from an in-vehicle human operator maneuvering the vehicle, from a remote human operator tele-maneuvering the vehicle, from an in-vehicle algorithm maneuvering the vehicle, or from a remote algorithm tele-maneuvering the vehicle, or a combination of them. A guidance may be received from a remote server through wired or wireless, or both, communication.

In some embodiments, receiving a guidance command includes sending a command request from the vehicle to a remote server followed by receiving a command from the remote server.

In some embodiments, a guidance command is transmitted from an in-vehicle human operator or from a remote chauffeur or from both. A remote chauffeur may comprise a human operator or an algorithm, or both.

In some embodiments, a guidance command is modified. The modification may include altering one or more of components in the guidance command, e.g., a route, a path, a traveling distance, a lane, a lane change, a speed, a speed limit, a velocity, an angular velocity, an acceleration, an acceleration limit, a lateral acceleration, a lateral acceleration limit, a longitudinal acceleration, a longitudinal acceleration limit, a deceleration, a deceleration limit, a lateral deceleration, a lateral deceleration limit, a longitudinal deceleration, a longitudinal deceleration limit, a speed profile, an acceleration profile, a deceleration profile, an orientation, a longitudinal orientation, a lateral orientation, a goal location, a motion plan, a driving task, a parking task, a pickup task, a drop-off task, a parking location, a pickup location, a drop-off location, a point-to-point navigation, a steering angle, a brake percentage, a throttle percentage, a pedal position, a gear selection, a gear shifter position, an object distance offset, an object time offset, a turning rate, a turning rate limit, or one or more control parameters.

Environment Perception

The technology described in this document may include one or more sensors or use one or more sensors. Examples of sensors include, but are not limited to, cameras, lidars, radars, inertial measurement units, accelerometers, gyroscopes, global position systems, infrared cameras, ultrasonic sensors, rain sensors, wetness sensors, microphones, crash sensors, tire pressure sensors, odometry sensors, dead reckoning sensors, and range sensors.

In some embodiments, the technology uses one type of sensor. In some embodiments, the technology uses two or more types of sensors. In some embodiments, for a single sensor type, the technology may use one or more sensors.

In some embodiments, sensor data are received from sensors installed on the vehicle; for example, exterior of the vehicle, interior of the vehicle or both. A vehicular safety control system may receive sensor data from one or more sensors on the vehicle. In some cases, sensor data are received from a remote server through wired communication, or wireless communication, or both.

The technology described in this document includes a computer or uses a computer for analyzing sensor data and guidance commands. In various embodiments, analyzing sensor data and/or guidance commands relies on using a pre-recorded map. In some cases, a pre-recorded map comprises a detailed map of an environment. A pre-recorded map may have a resolution of less than or equal to 1 millimeter, 1 centimeter, 1 meter, 10 meters, 100 meters, 1 kilometer, or 10 kilometers. In some applications, a pre-recorded map includes human annotations. In some scenarios, a pre-recorded map is derived from sensor data. In some embodiments, a pre-recorded map comprises topological road networks. In some implementations, a pre-recoded map comprises lane widths and/or road widths, or comprises information (e.g., annotations, features) to be analyzed to determine the lane widths and/or road widths. In some embodiments, a pre-recorded map comprises information to be analyzed to determine a geometric map of an environment.

In some implementations, analyzing sensor data and/or guidance commands does not rely on a pre-recorded map. In some embodiments, the analysis does not rely on a pre-recorded map having a resolution of less than or equal to 1 millimeter, 1 centimeter, 1 meter, 10 meters, 100 meters, 1 kilometer, or 10 kilometers. In some cases, the analysis does not rely on a pre-recorded map having annotations. In some applications, the analysis does not rely on a pre-recorded map being derived from sensor data. In some scenarios, the analysis does not rely on a pre-recorded map having lane widths and/or road widths or having information for deriving lane widths and/or road widths. In some embodiments, the analysis does not rely on a pre-recorded map information for deriving a geometric map of an environment.

Figure 6:
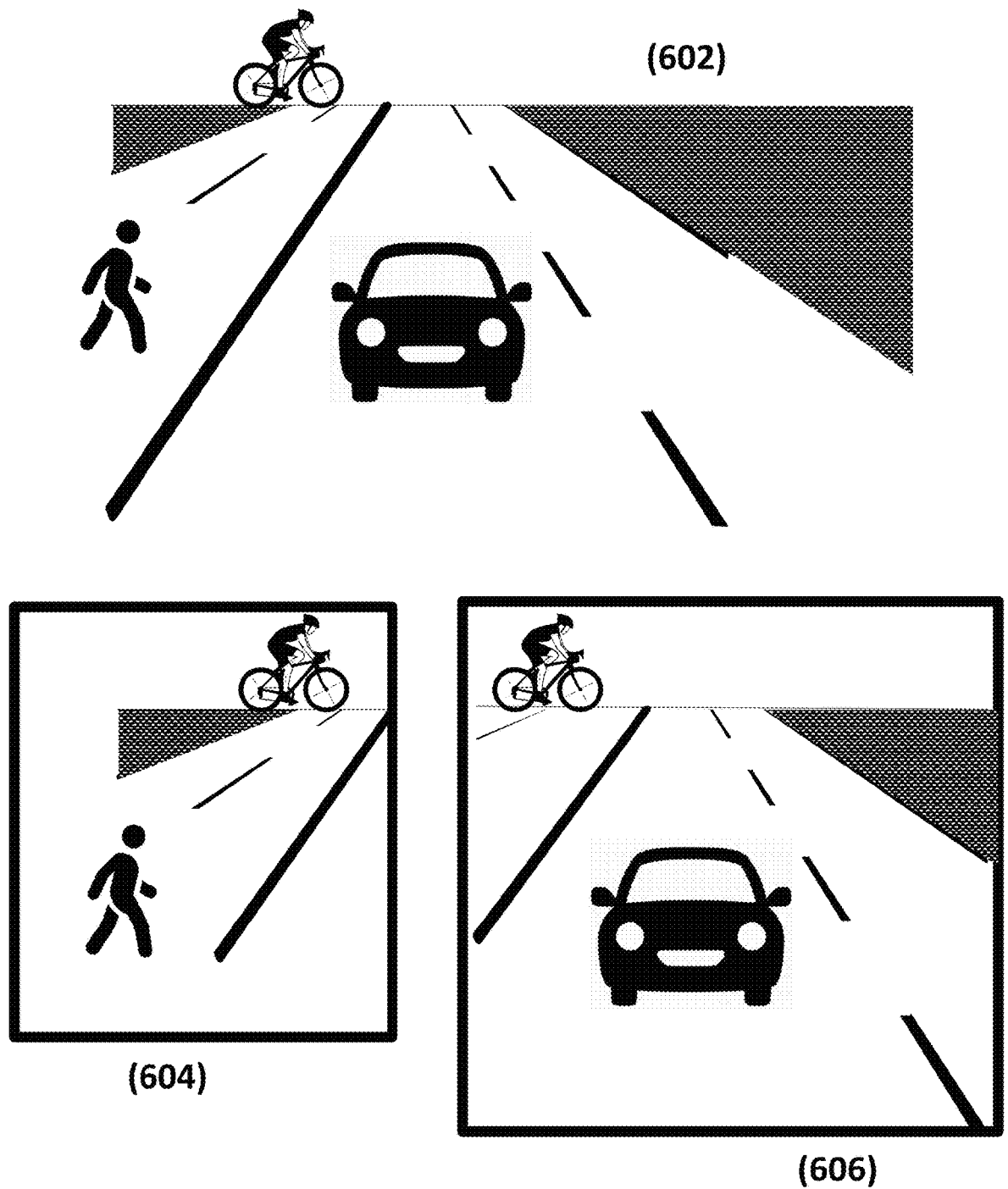
FIG. 6 is an example of sensor data.

In various embodiments, analyzing sensor data and/or guidance commands comprises creating a representation of an environment when the vehicle is in operation. In some implementations, the analysis comprises integrating disparate measurements of the environment into a single space, and aggregating measurements of the environment over time. For instance, FIG. 6 shows an example where an environment 602 is captured by two sensors with different views 604 and 606 of the environment; thus, the analysis will perform integration of the two measurements for each point in time and then aggregation of those measurements over time.

In various embodiments, the analysis may discard the representation of the environment, a history of the representation of the environment, or a partial history of the representation of the environment when a distance or a time, or both, between first (e.g., earlier) measurements and second (e.g., current) measurements constituting a first (e.g., earlier) representation and a second (e.g., current) representation exceeds a threshold. For example, when the vehicle is distal (e.g., at least 1 meter, 5 meters, 10 meters, 20 meters, 30 meters, 40 meters, 50 meters, 60 meters, 70 meters, 80 meters, 90 meters, 100 meters, 200 meters, 300 meters, 400 meters, 500 meters, or 1000 meters; at least 1 second, 10 seconds, 20 seconds, 30 seconds, 40 seconds, 50 seconds, 1 minute, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, or 12 hours) away from the environment, the distal representation and/or the measurements of the distal representation may be discarded.

In various embodiments, analyzing sensor data and/or guidance commands comprises detecting a software failure in the vehicle, in one or more sensors, or a combination of them. The analysis may detect a hardware failure in the vehicle, in one or more sensors, or a combination of them. The analysis may assess sensor data reliability, for instance, blocked sensors or partially covered sensors or fully covered sensors. The analysis may assess plausibility of the sensor data.

In various embodiments, analyzing sensor data and/or guidance commands comprises detecting a loss of a wired or wireless communication link. The analysis may assess quality of a wired or wireless communication link, for instance, latency, bandwidth, throughput, reliability, availability, data corruption, etc.

In various embodiments, analyzing sensor data and/or guidance commands comprises detecting incapacitation of an in-vehicle human operator. The analysis may detect one or more conditions in a vehicle cabin, for example, application or removal of a seat belt, a passenger entering or departing a front or driver seat, presence of a child seat, deployment of an airbag, invalid seating position, smoke, fire, obstructed view, or a blockage of an airbag. The analysis may detect one or more vehicle conditions, e.g., door closing or opening, door locking or unlocking, trunk closing or opening, or hazard light operation. The analysis may detect one or more environmental conditions, comprising illuminance, glare, reflections, shadows, cloud cover, rain, standing water, hail, sleet, fog, smoke, dust, spray, splash, or snow; the analysis may assess the capability of sensors (e.g., visibility of cameras) due to one or more environmental conditions.

In various embodiments, analyzing sensor data and/or guidance commands comprises assessing plausibility of a representation of an environment. The analysis may use physical measurements of objects in an environment, e.g., distance, speed, acceleration, size, velocity, friction coefficient, reflectivity, color, etc. In some implementations, the analysis maps the sensor data and the guidance command into a common representation space of an environment; for instance, a common representation for the sensors' views and for the space of controlling/maneuvering the vehicle is derived. In some examples, an optical flow is derived from cameras, and a control signal avoiding collisions can be generated in the space represented by the optical flow.

In various embodiments, the common representation space of an environment comprises, or only corresponds to, an environment observed by one or more sensors. For example, in FIG. 6, an environment 602 is observed by two cameras with different fields of view 604 and 606, and the analysis integrates (e.g., by applying affine transformations, stitching, overlap maximization, etc.) the two views into a single representation of the environment. In some implementations, the common representation space of an environment comprises one or more of the following: depth information, flow information (e.g., in the longitudinal and/or lateral orientations of the vehicle), surface drivability information, occlusion information, time-to-collision information, semantic information of the environment, or dynamic information of the environment.

In various embodiments, analyzing sensor data and/or guidance commands does not depend on reasoning about an actor's intended motion; e.g., does not predict behaviors, or motion plan, or a driver's intent.

In various embodiments, analyzing sensor data and/or guidance commands comprises analyzing a dynamic feasibility of a motion plan with respect to the guidance command. The analysis may analyze a possibility of colliding with an object. The analysis may identify drivability of a surface. Analyzing drivability of a surface may use geometric information of the surface to determine the drivability of the surface. In some cases, analyzing drivability of a surface comprises analyzing one or more geometric variations of the surface. In some implementations, analyzing drivability of a surface comprises deriving one or more confidence scores to measure regions of drivability of the surface; for instance, the system can consider an analysis window around points to compute confidence scores.

In various embodiments, analyzing sensor data and/or guidance commands comprises detecting one or more occlusions. The occlusion detection may be performed at a measurement level. In some cases, the occlusion detection is based on the sensing capabilities of sensors; for instance, objects beyond the maximum range of a sensor are effectively occluded by the sensor capabilities. The occlusion detection may include detecting a surface discontinuity. The occlusion detection may derive one or more confidence scores to measure neighborhoods of support.

Figure 7:
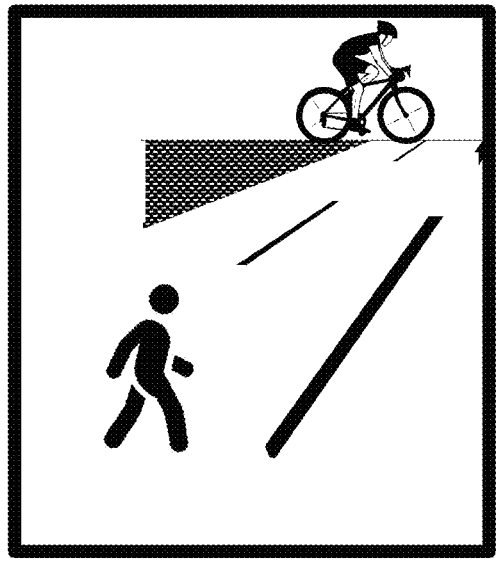
FIG. 7 is an example of a scene flow analysis.
Figure 7:
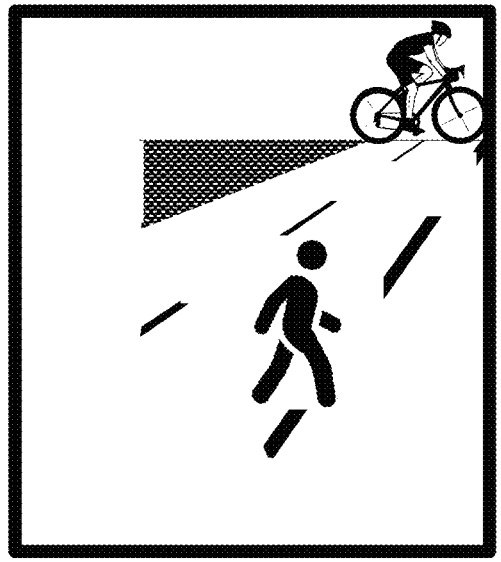
Figure 7:
Figure 7:

In various embodiments, analyzing sensor data and/or guidance commands comprises analyzing a scene flow. The scene flow analysis may determine a rate of sensor data changes, a flow of velocity, a flow of objects, or a flow of directions, or a combination of them. For example, in FIG. 7, a sensor observes a scene with changes from 702 to 704; based on the changes the analysis can infer that the bicyclist 706 moves to East and the pedestrian 708 moves to Northeast, where the arrows indicate the direction and the length of arrows indicate the magnitude of movement. In some embodiments, the flow analysis includes derivation of a depth map from measurements from one or more sensors aggregated over time, or derived from direct or indirect depth measurements from one or more sensors, or both. The scene flow analysis may estimate, based on a depth map, a longitudinal density flow or a lateral density flow or both. Analyzing a scene flow may aggregate lateral or longitudinal or both flows based on volumetric data derived from a depth map. In some cases, the scene flow analysis comprises determining a direction or a magnitude or both of a flow near an occlusion. The scene flow analysis may include deriving one or more confidence scores to measure spatial or temporal, or both, consistency.

In various embodiments, analyzing sensor data and/or guidance commands comprises analyzing uncertainty in the data, uncertainty in the sensor capabilities, uncertainty in the sensor status, or a combination of them.

In various embodiments, analyzing sensor data and/or guidance commands comprises detecting a collision. The analysis may assess a potential collision risk in an environment.

In various embodiments, any of the above steps (e.g., occlusion detection, scene flow analysis, sensor processing, collision detection, risk estimation, etc.) of analyzing sensor data and/or guidance commands is performed at a constant running time. The constant running time is achieved by maintaining the size of environment representation to be constant; for instance, sensors return a same magnitude of points, independent of scene complexity. Since the environment representations are the inputs to the analysis steps, computational time of the analysis steps may also remain constant.

Vehicle Control

The technology described in this document may include vehicle control. The vehicular safety control system may generate a control signal. The control signal may be passed to actuators. The control signal may be visualized. The control signal may be shared with a computational process external to the vehicular safety control system. The control signal may be transmitted from and to a remote server.

Control signals are in the form of machine-readable instructions, which may or may not be readily human readable. Examples of control signals include, but are not limited to, a direction, the direction including a forward direction, a rear direction, an up direction, a down direction, a left direction, a right direction, a speed, a velocity, an acceleration, a deceleration, an orientation, an orientation change, a steering angle, a steering angle change, a torque, a torque change, a throttle, a throttle change, a brake percentage, a throttle percentage, a pedal position, a gear selection, a gear shifter position, a traveling distance, a traveling distance change, a route, a route change, a path, a path change, a lane, a lane change, a route, a path, a speed, a velocity, an acceleration, a deceleration, an orientation, a longitudinal orientation, a lateral orientation, a goal location, a motion plan, a driving task, a parking task, a pickup task, a drop-off task, a parking location, a pickup location, a drop-off location, a point-to-point navigation, or a combination of them. Control signals may include absolute values, relative values, or changes in value for each of these examples.

In various embodiments generating a control signal is based on sensor data of one or more sensors. Generating a control signal may comprise identifying one or more safe state spaces. In some examples, a safe state space includes one or more vehicle states able to avoid a collision. In some cases, a safe state space comprises a space with a reduced collision risk or a minimal collision risk. In some implementations, a safe state space comprises a space with a reduced collision loss or a minimal collision loss when a collision is inevitable. In some embodiments, identifying one or more safe state spaces comprises approximating the one or more safe state spaces. For instance, FIG. 8 shows an example where the vehicular safety control system analyzes a scene flow and infers dynamics of the bicyclist, the pedestrian and the ego vehicle, and identifies two safe state spaces 802 and 804 to avoid colliding with the bicyclist and pedestrian.

In various embodiments, generating a control signal includes employing a model with a cost function considering various factors: monetary, time, energy consumption, physical damage, or human or animal injury, or a combination of those; minimizing the cost function leads to an optimal solution associated with an optimal control signal. Referring again to FIG. 8, the vehicular safety control system may decide to avoid colliding with the pedestrian and thus identify driving onto the non-drivable surface 806 as the optimal control although reaching the non-drivable surface 806 may cause damage to the ego vehicle. A cost function may rank one or more control signals. For example, a cost function may rank possible vehicle controls entering the two safe state spaces 802 and 804 higher than controls entering the non-drivable space 806.

In various embodiments, generating a control signal comprises identifying one or more stopping regions. A stopping region may extend from an object or from a group of objects. A stopping region may have one or more subregions enabling the vehicle to avoid or mitigate a collision. In some cases, two stopping regions include disjoint stopping paths. In some implementations, identifying one or more stopping regions is based on evaluating occlusion information by hypothesizing one or more conservative stopping regions along an occlusion boundary.

Figure 8:
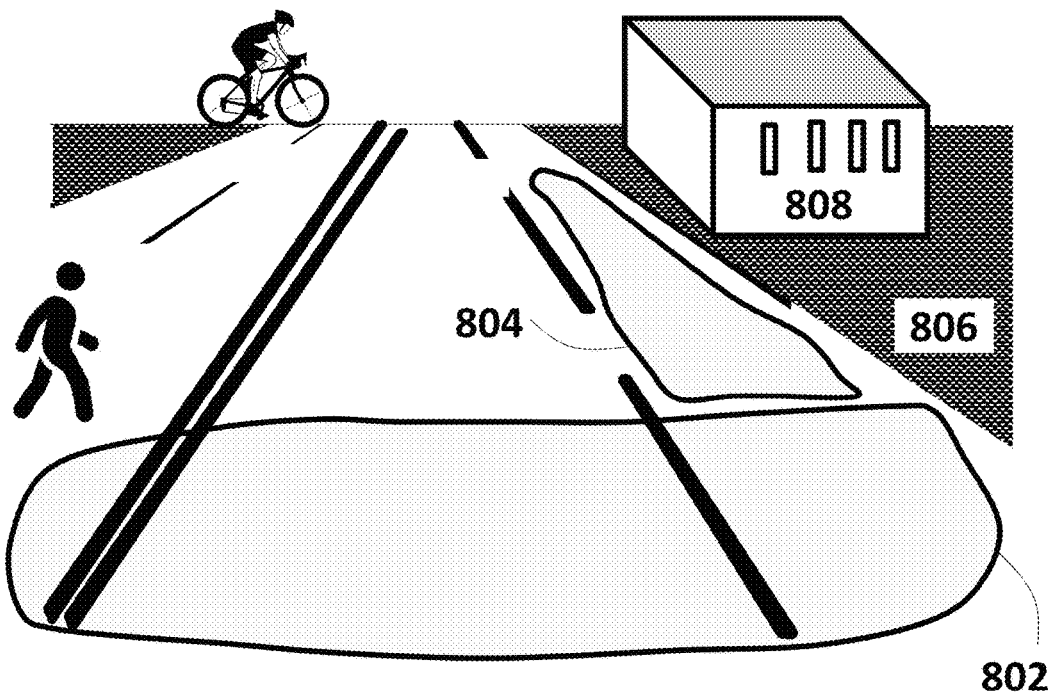
FIG. 8 is an example of identifying safe state spaces and stopping regions.

For instance, in FIG. 8, a building 808 partially blocks the view of a sensor, so the system may hypothesize stopping regions extending from the occlusion due to the building 808. These hypothesized stopping regions could cause the ego vehicle to limit or ignore any controls that take the vehicle into the proximity of the occlusion. The identification may evaluate driving surface information by treating one or more measured non-drivable surface boundaries as immobile objects. The identification may use vehicle-to-anything communications to receive information about one or more stopping regions. For example, in FIG. 8, a vehicle-to-anything communication may indicate the space 802 as the available stopping region that avoids conflict.

Figure 9:
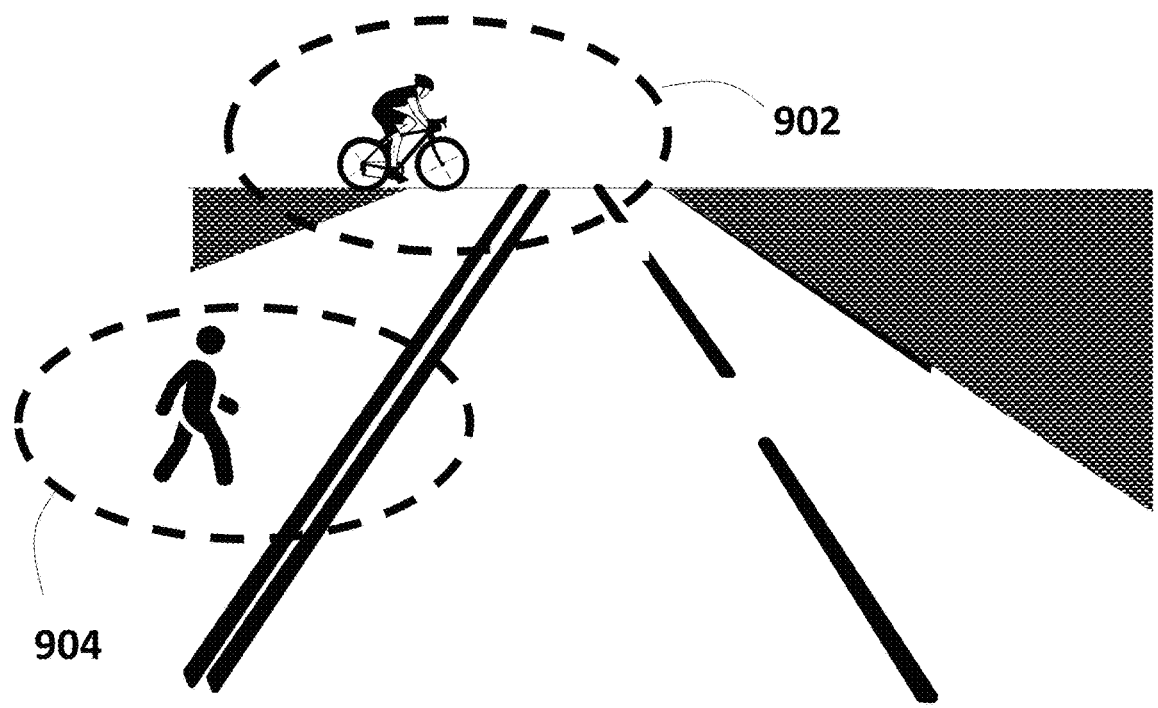
FIG. 9 is an example of safe envelopes of objects.

In various embodiments, generating a control signal comprises generating a safe envelope of the vehicle, or a safe envelope of an object, or both. For example, in FIG. 9, the vehicular safety control system may identify envelopes 902 and 904 associated with the bicyclist and pedestrian.

In various embodiments, generating a control signal comprises evaluating a dynamic state, such as speed, acceleration, velocity, a model describing motion, a dynamic system, or dynamics derived from physical measurements, or a combination of them. In some implementations, the control signal generation evaluates a dynamic state of one or more objects inferred from a scene flow; for instance, the vehicular safety control system may determine the dynamics of the bicyclist 706 and pedestrian 708 in FIG. 7. In some cases, generating a control signal may evaluate system dynamics for the ego vehicle reaching a stopping condition; for example, in FIG. 8 where possible stopping regions 802, 804 and 806 are identified using system dynamics, the system further evaluates the cost of entering these regions.

In various embodiments, generating a control signal comprises identifying a mitigation space when a collision is inevitable. Generating a control signal may include minimizing a relative velocity between the vehicle and one or more objects or minimizing the expected kinetic energy lost in a potential impact. Generating a control signal may consider object information such as type, weight, velocity, orientation, etc. Generating a control signal may comprise optimizing the control signal with respect to the guidance command based on an evaluation metric or a loss function, e.g., L1, L2, a user-defined metric. Optimizing the control signal with respect to the guidance command may consider a smoothness constraint on a speed, an orientation, an acceleration, a deceleration, a torque, a jerk, or a turn, or a combination of them. In some cases, the optimization considers a distance to a safe space, to a stopping space, to a risk mitigation space, or a combination of them. A control signal may be updated when a change in a scene captured in the sensor data is detected.

The technology described in this document may include a control process mode. When the control process mode is in a passive mode, generating a control signal comprises converting the guidance command into the control signal. Similarly, when the control process mode is in an active mode and when a potential risk is not detected, generating a control signal comprises converting the guidance command into the control signal. However, when the control process mode is an active mode and when a potential risk is detected, generating a control signal comprises modifying the guidance command followed by converting the modified guidance command into the control signal. In some implementations, regardless of the state of the control process mode, the system activates an emergency safety function that prevents a collision.

The technology described in this document may include passing vehicle guidance from an in-vehicle human to an algorithmic operator, wherein the algorithmic operator is in a remote server, or in the vehicle, or both. In general, guiding the vehicle may serve one or more purposes, e.g., pick-up, drop-off, refuel, collision avoidance, rule-following, etc. In some embodiments, the system enforces a control process mode to be in an active mode. In some cases, a remote operator can choose to take over at any time. In some implementations, the sensor data acquired at the vehicle are streamed to the remote server.

In various embodiments, a control signal is transferred to one or more actuators of the vehicle, so the vehicle can move according to the control signal.

The technology described in this document may share an estimated potential risk with an external computing process, an external algorithm, a remote server, a remote operator, an in-vehicle human operator, an out-of-vehicle human operator, or a combination of them.

Remote Chauffeur

The technology described in this document may include a remote chauffeur, or use a remote chauffeur. A remote chauffeur may be a human operator, or an algorithm, or a combination of them. In general, the role of a remote chauffeur is to take over a driving task; a driving task comprises real-time operational and tactical functions required to navigate a vehicle. A remote chauffeur may perform a driving task for a vehicle that the remote chauffeur does not occupy. A remote chauffeur may perform a driving task for an unoccupied vehicle.

In various embodiments, a vehicular safety control system comprises transferring vehicle guidance from an in-vehicle human to a remote chauffeur. Transferring vehicle guidance from an in-vehicle human to a remote chauffeur may be initiated by the remote chauffeur. In some cases, the transfer is initiated by an emergency condition, e.g., a fire in cabin, incapacitated driver, etc. In some embodiments, the transfer is initiated by detection of a prohibited condition. In some embodiments, the transfer is initiated by the in-vehicle human.

Figure 10:
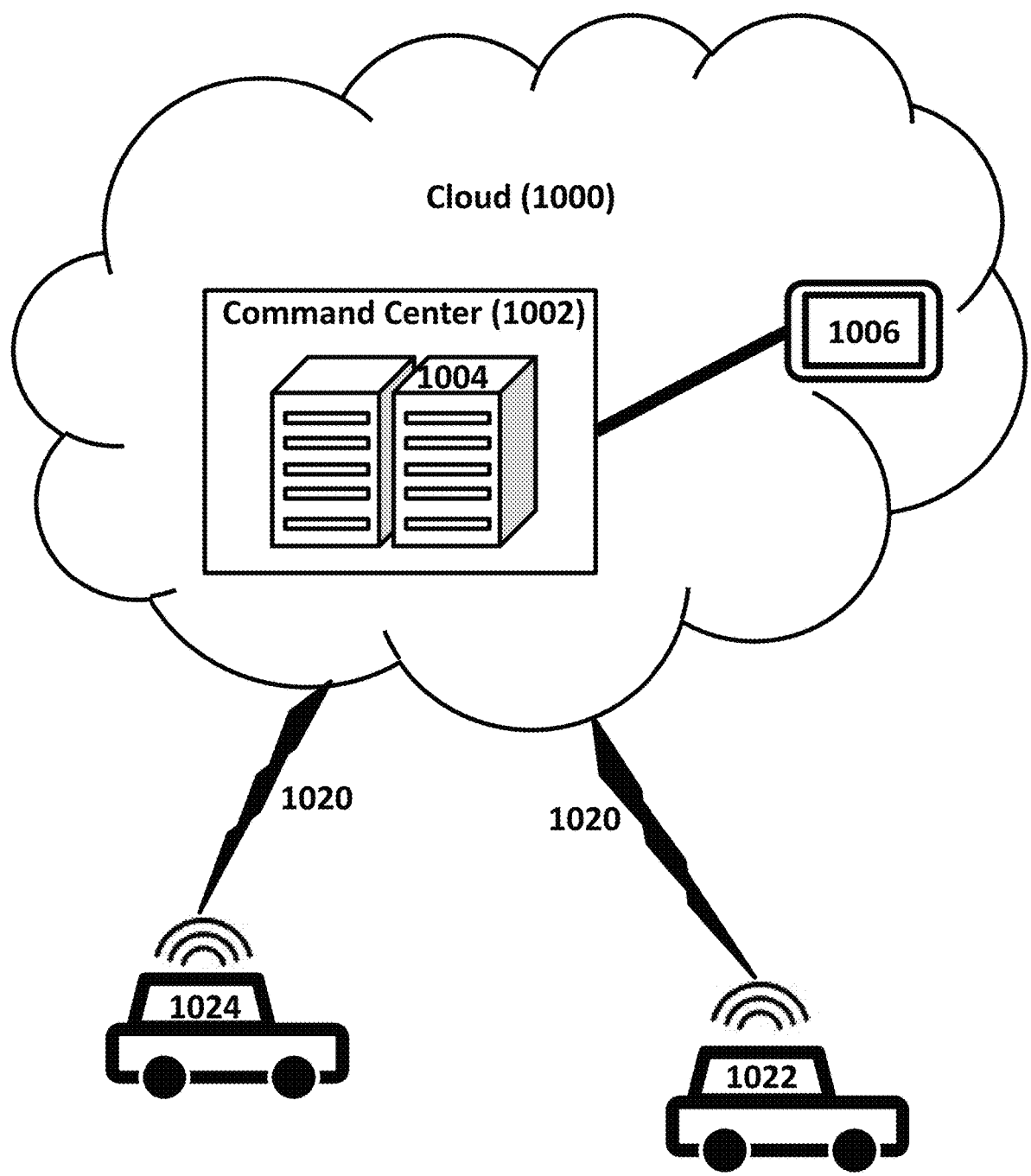
FIG. 10 is an example of a remote chauffeur.

In various embodiments as illustrated in FIG. 10, a vehicular safety control system comprises a command center 1002 which is remote in a cloud 1000 and enables a remote chauffeur 1004 to perform the driving task for one or more vehicles (e.g., 1022 and 1024). A remote chauffeur 1004 (e.g., a human, or a machine with algorithms) has access to a workstation with a display 1006, and a communications link 1020 (e.g., 4G, 5G, 6G, WiFi, radio frequency) that is established between a vehicle (e.g., 1024) and the command center 1002. In some cases of remote driving, sensor data is streamed over a communications link from the vehicle and displayed on the workstation of the remote driver. The remote chauffeur provides the vehicle guidance commands that are returned over the communications link to the vehicle. The vehicle may then control on the guidance commands. In some embodiments of remote driving, a vehicular safety control system is active on the vehicle to prevent collisions with objects in the vehicle vicinity. The system ensures safe behavior of the vehicle in case the remote chauffeur fails to perform the driving task or during communications link failures (e.g., high latencies or no network).

In various embodiments, a vehicular safety control system comprises virtual vehicle operation functions (e.g., a steering wheel, a braking system, a gear stick, pedals, actuators, etc.) in a remote site to allow a remote chauffeur to perform a driving task. There may be different classes of remote chauffeurs, each offering different service levels. Some may offer additional speed ranges or other capabilities (e.g., a more advanced remote driving feature may drive at higher speeds, in larger geofenced areas, on different road types, etc.). Driver classes may also depend on their training or licensing, e.g., if they have been trained with larger tractor-trailer trucks or only with vehicles for personal use. In cases of an algorithmic remote chauffeur, training may be performed based on machine learning.

In various embodiments, there may be a one-to-one mapping between a specific remote chauffeur and a specific vehicle user. A remote chauffeur may be assigned to a vehicle user based on available background information about the user. In some examples, the matching between a remote chauffeur and a vehicle user is random. Examples for background information about a user include, but are not limited to: radio station or music preference, cabin temperature preference, driving style preference, seating position preference, vehicle fragrance preference, the user's desire to converse during remote driving, prior conversations or topics of discussion that occurred between a remote chauffeur and the user. In some instances, the assignment between the remote chauffeur and user may be based on vehicle type preference. In some applications, when a remote chauffeur is aware of a user's background information (e.g., through user's history), the remote chauffeur may set the vehicle up to the user's liking before the user picks up the vehicle or during the driving task.

In various embodiments, a remote chauffeur and an in-vehicle person may carry out a verbal conversation via microphones and speakers in the vehicle and the command center. Conversation may be automatically analyzed for topics of interest or other elements and recorded as background information about the user.

In various embodiments, a remote chauffeur performs concierge services upon request, for example: restaurant reservations, calling ahead to a business establishment to check hours, recommendations about local stores, etc.

In various embodiments, a communication link between a command center and a vehicle is established. In some cases, the wireless link comprises an audio link via a microphone or a speaker. A communication link may be monitored by a vehicular safety control system. Communication link quality (e.g., latency, signal-to-noise ratio, etc.) can be monitored. If a communication link latency threshold is exceeded, the vehicular safety control system may issue a stopping, deceleration, or another control command to reduce or mitigate risk.

In various embodiments, a vehicle with a vehicular safety control system comprises sensors and a communication link to a command center. The vehicular safety control system may receive guidance commands from a remote chauffeur that include remote steering and actuation commands. The vehicle may comprise drive-by-wire capabilities for steering and actuation command execution. In some cases, sensor data is streamed from the vehicle to the command center. In some embodiments, the vehicle has lights or a lightbar on the vehicle interior or exterior to show a certain color or color pattern or animation; lights may be placed at various locations on the vehicle (e.g., roof rack, front, back, sides, doors, etc., and include regular head- or tail-lights). Some implementations of vehicles include internal and/or external speakers, displays, or microphones on the vehicles. In various embodiments, whenever a vehicle is controlled by a remote chauffeur, the vehicle may communicate with pedestrians or other road users via on-vehicle features (e.g., hazard lights active, external displays may show information to surrounding traffic, vehicle may play sounds, vehicle may project information onto the ground surrounding the vehicle, etc.). In some examples, a vehicle has a request module inside the cabin (e.g., screen, button, microphone) through which an in-vehicle person may request a remote driver to take over the driving task.

In various embodiments, a vehicular safety control system comprises a user interface between a vehicle and a remote chauffeur. A remote chauffeur may provide longitudinal and lateral control commands directly (e.g., through steering wheel and pedals at remote workstation) or indirectly by providing a higher-level guidance command that can be converted into longitudinal and lateral control signals. In some implementations, conversion of higher-level guidance commands into longitudinal and lateral control signals may take place at the remote command center or on-board the vehicle (e.g., via an on-vehicle control system).

In various embodiments, a vehicular safety control system comprises a user interface between a vehicle and a vehicle user (an in-vehicle person or an outside-vehicle person). At a point in time, users can be external to the vehicle or internal. When internal to the vehicle, users may act as in-vehicle drivers (who perform the driving task) or as passengers. Various examples are described below.

Empty vehicle arrival. An empty vehicle may arrive to pick up a specific user who requested a pick-up on a device, such as a smartphone. As one example, the vehicle arrival is for retrieving the vehicle from a valet parking service. In some implementations, the vehicle arrival is for re-balancing a fleet of vehicles. In some applications, the vehicle arrival is for picking up objects (e.g., goods, groceries, containers, etc.). A user interface of an arriving vehicle may comprise or perform or allow one or more of the following: lights (e.g., head-, tail-, or other lights) or a lightbar on the vehicle may show a certain color or color pattern or animations; external displays outside on vehicle may show an animation; devices (e.g., a digital projector) may project information on the ground around the vehicle; the vehicle may play a particular sound, including a spoken language; the vehicle may open the door(s) and/or trunk or other storage compartments (in the case a special-purpose vehicle, e.g., parcel delivery) when stationary.

Empty vehicle departure after user use. A remote chauffeur may park the vehicle after use similar to a valet-parking service. In some implementations, a remote chauffeur operates the vehicle to rebalance vehicle locations in a fleet. In some cases, a user of the vehicle may get feedback about a vehicle location on their device, such as a smartphone.

Non-empty vehicle. An in-vehicle person may request a remote chauffeur to take over through a vehicle request module. In addition to entering information through the request module (e.g., via touchscreen, button press, or by communication via spoken language, or a combination of those), the in-vehicle person may choose to move to a different seat before, during, or after the request, e.g., to issue a request from a back seat. In some embodiments, an in-vehicle driver takes over during remote driving (i.e., initiated by the in-vehicle driver). For instance, the driver takes control of a steering wheel, or braking, or accelerating directly or requests a stop ("pull over") from the remote chauffeur through the request module in the cabin, via a cellphone, etc. In some embodiments, an in-vehicle driver take-over is initiated by a remote chauffeur due to some reasons (e.g., a low signal intensity in a communication link), and the vehicular control system may ask a vehicle user to take over the vehicle driving task via displays, sounds, etc. In some embodiments, an in-vehicle take-over or a remote driving take-over is initiated by a vehicular safety control system, e.g., after activation of vehicle safety function, and the system may inform either or both of the in-vehicle or remote chauffeur of the activation via displays, sounds, etc.

The technology described in this document may generate the status of safety information. The safety information may be displayed or visualized to an in-vehicle person, a person external to the vehicle, and/or a remote chauffeur.

The technology described in this document may repeat the steps (and/or sub-steps) of analysis and control over time.

The technology described in this document may be implemented in software executable on a computing device, in a server-client computing environment, or in hardware (e.g., ASIC, or FPGA, or an embedded system, or a combination of them), or in a combination of them. Thus, the technology can be provided as a software as a service, as a hardware as a service, or as a combined software and hardware as a service.

Other implementations are also within the scope of the claims.

The invention claimed is:

1. A computer-implemented method of controlling a vehicle, the method comprising:
   (a) receiving, by a sensing processor in the vehicle, sensor data and real-time streaming the sensor data to a remote chauffeur;
   (b) receiving, by a command processor in the vehicle, a guidance command from the remote chauffeur to teleoperate the vehicle;
   (c) analyzing, by an analysis processor in the vehicle, the sensor data and the guidance command, wherein the analysis comprises assessing a potential risk;
   (d) generating, by a controller in the vehicle, a control signal from the guidance command, wherein
      (1) when a potential risk is not detected by the analysis processor, generating a control signal by the controller comprises converting the guidance command into the control signal, and
      (2) when a potential risk is detected by the analysis processor, generating a control signal by the controller comprises
         (i) activating a safety control processor in the vehicle to take over operating the vehicle,
         (ii) modifying the guidance command to avoid the potential risk, and
         (iii) converting the modified guidance command into the control signal; and
   (e) transferring, by the controller in the vehicle, the control signal to an actuator of the vehicle.

2. The method of claim 1, wherein the sensor data comprises data from one or more cameras, one or more lidar sensors, one or more radar sensors, one or more inertial measurement units, one or more accelerometers, one or more gyroscopes, one or more global position systems, one or more infrared cameras, one or more ultrasonic sensors, one or more rain sensors, one or more wetness sensors, one or more microphones, one or more crash sensors, one or more tire pressure sensors, one or more odometry sensors, one or more dead reckoning sensors, one or more range sensors, or a combination of them.

3. The method of claim 1, wherein the guidance command comprises a route, a path, a traveling distance, a lane, a lane change, a speed, a speed limit, a velocity, an angular velocity, an acceleration, an acceleration limit, a lateral acceleration, a lateral acceleration limit, a longitudinal acceleration, a longitudinal acceleration limit, a deceleration, a deceleration limit, a lateral deceleration, a lateral deceleration limit, a longitudinal deceleration, a longitudinal deceleration limit, a speed profile, an acceleration profile, a deceleration profile, an orientation, a longitudinal orientation, a lateral orientation, a goal location, a motion plan, a driving task, a parking task, a pickup task, a drop-off task, a parking location, a pickup location, a drop-off location, a point-to-point navigation, a steering angle, a brake percentage, a throttle percentage, a pedal position, a gear selection, a gear shifter position, an object distance offset, an object time offset, a turning rate, a turning rate limit, one or more control parameters, or a combination of them.

4. The method of claim 1, wherein the guidance command from the remote chauffeur comprises instructions generated by an algorithm or by a human operator.

5. The method of claim 1, wherein analyzing the sensor data and the guidance command (1) comprises computing a scene flow, environment dynamics, environment semantics, depth information, occlusion information, or time-to-collision, and (2) excludes using geometric information of a lane given in a lane-level map.

6. The method of claim 5, wherein analyzing the sensor data and the guidance command excludes using one or more of the following given in the lane-level map: information of a lane width, information enabling derivation of a lane width, information of a road width, information enabling derivation of a road width, a geometric map of an environment, information for deriving a geometric map of an environment, a road network topology, and information for deriving a road network topology.

7. The method of claim 5, wherein analyzing the sensor data and the guidance command excludes using lane information annotated by a human on the lane-level map.

8. The method of claim 5, wherein analyzing the sensor data and the guidance command comprises deriving lane-level information in real-time from the sensor data.

9. The method of claim 5, wherein analyzing the sensor data and the guidance command comprises creating a representation of an environment when the vehicle is in operation.

10. The method of claim 5, wherein analyzing the sensor data and the guidance command comprises detecting one or more vehicle conditions, the one or more vehicle conditions comprising a vehicle component failure.

11. The method of claim 5, wherein analyzing the sensor data and the guidance command depends on physical quantity measurements from sensor readouts.

12. The method of claim 5, wherein analyzing the sensor data and the guidance command does not depend on object recognition and modeling an actor's behavior or intent in an environment.

13. The method of claim 5, wherein analyzing the sensor data and the guidance command comprises analyzing a possibility of a collision.

14. The method of claim 5, wherein analyzing the sensor data and the guidance command comprises analyzing drivability of a surface.

15. The method of claim 1, wherein the control signal comprises a speed, a velocity, an acceleration, an acceleration change, a deceleration, a deceleration change, an orientation, an orientation change, a steering angle, a steering angle change, a torque, a torque change, a throttle, a throttle change, a brake percentage, a brake percentage change, a throttle percentage, a throttle percentage change, a pedal position, a pedal position change, a gear selection, a gear selection change, a gear shifter position, a gear shifter position, change, a traveling distance, a traveling distance change, a route, a route change, a path, a path change, a lane, or a lane change, or a combination of them.

16. The method of claim 1, wherein generating a control signal comprises identifying one or more safe state spaces.

17. The method of claim 16, wherein a safe state space comprises one or more vehicle states able to avoid a collision.

18. The method of claim 16, wherein a safe state space comprises a space with a reduced collision risk or a minimal collision risk.

19. The method of claim 16, wherein a safe state space is derived from a model minimizing a cost function, the cost function comprising one or more the following factors: monetary, time, energy consumption, physical damage, human or animal injury, or a combination of those.

20. The method of claim 16, wherein a safe state space comprises a space with a reduced collision loss or a minimal loss when a collision is inevitable.

\* \* \* \* \*